Figure 1:
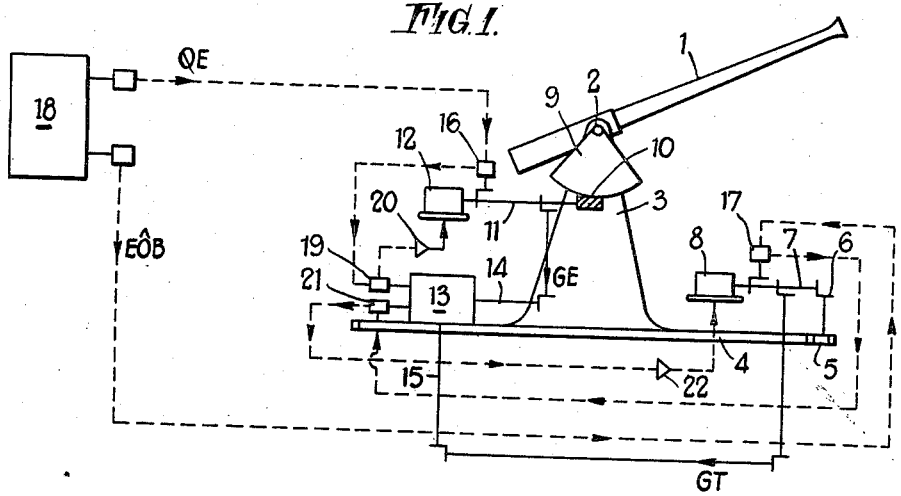

June 30, 1959  J. R. KELLY  2,892,384
TILT CORRECTOR FOR A GUN MOUNTING
Filed June 17, 1954  2 Sheets-Sheet 1

Inventor
John R. Kelly
By Pennie Edmonds Morton
Barrows & Taylor attys

June 30, 1959

J. R. KELLY 2,892,384

TILT CORRECTOR FOR A GUN MOUNTING

Filed June 17, 1954

2 Sheets-Sheet 2

United States Patent Office 2,892,384
Patented June 30, 1959

2,892,384

TILT CORRECTOR FOR A GUN MOUNTING

John Reginald Kelly, London, England, assignor to Vickers-Armstrongs Limited, London, England, a British company Application June 17, 1954, Serial No. 437,329

Claims priority, application Great Britain July 14, 1953

14 Claims. (Cl. 89—41)

This invention relates to tilt correctors and is concerned with a tilt corrector for use with a gun, radar director, sight or other article to be directed at a particular elevation with respect to a certain plane, usually horizontal, and at a particular training with respect to an axis in said plane and which gun, radar director, sight or other article is on a mounting which may be tilted with respect to said plane.

According to the present invention there is provided a tilt corrector for use with a gun, radar director, sight or other article which has to be directed at a particular angle of elevation with respect to a fixed plane and at a particular angle of training with respect to an axis in the plane and which gun, radar director, sight or other article is carried on a mounting which may be tilted, the corrector being adapted to be carried on said mounting, and comprising an analyzer, first means for feeding to the analyzer a first motion representative of the angle of training, GT, as measured with respect to the tilted plane of the mounting and a further axis determined by the intersection of the fixed and tilted planes, a reference member arranged so that it can be levelled without moving the tilted mounting, the reference member being connected to the analyzer to feed a second motion thereto, the second motion when said member is level being representative of the angle of tilt, T, between the fixed and tilted planes, the analyzer having means for converting the first and second motions into a third motion which is a function of the level of the gun, LG (as hereinafter defined), and a fourth motion which is a function of the cross level of the gun, CLG (as hereinafter defined), and the tilt corrector further comprising second means arranged to have a fifth motion imparted thereto which fifth motion is representative of the angle of elevation GE relative to the mounting, third means for combining the third, fourth and fifth motions to give an indication of the training correction required, and fourth means for combining the third, fourth and fifth motions to give an indication of the elevation correction required.

Whenever "gun" is referred to herein, it is to be understood that "radar director," "sight" or other article that has to be directed at a particular elevation and training, can be substituted therefor.

Figure 2:
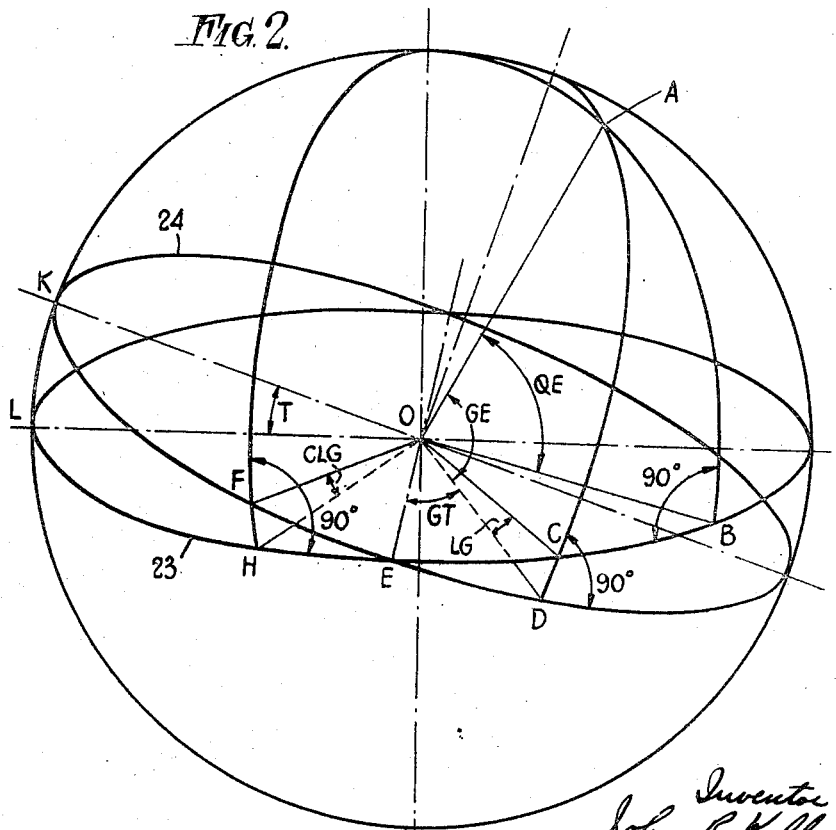
Figure 3:
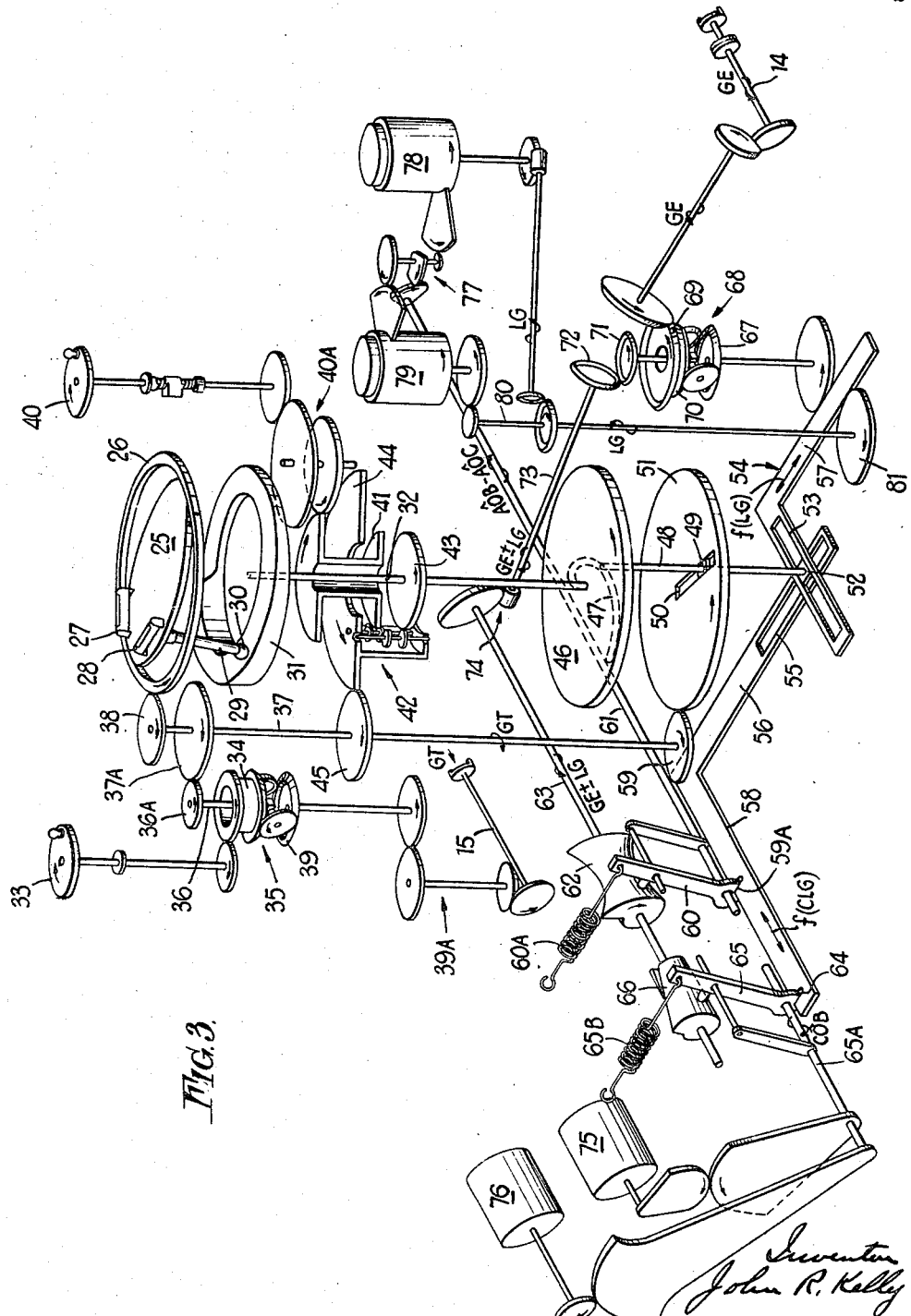

For a better understanding of the invention, reference will now be made to the accompanying drawings, in which:

Figure 1 is a diagrammatic representation of a gun mounting and the elevation and training mechanism for the gun, Figure 2 is a geometrical diagram, and Figure 3 is a diagrammatic perspective view, partly sectioned, of a tilt corrector.

Referring to Figure 1, a gun 1 has trunnions 2 carried in a pedestal 3 on a turntable 4 which is arranged to be driven by a pinion 5. The pinion 5 is connected by bevel gearing 6 to the output shaft 7 of a training motor 8. One of the trunnions 2 has a quadrant 9 secured thereto, the quadrant being arranged to be driven by a worm 10 on the output shaft 11 of an elevating motor 12.

The tilt corrector 13 is carried on the turntable. The tilt corrector has an elevation input shaft 14 which is connected by bevel gearing to the shaft 11. The tilt corrector has a training input shaft 15 which is connected through gearing to the shaft 7.

An elevation resetter 16 is connected by gearing to the shaft 11 and a training resetter 17 is connected by gearing to the shaft 7.

The angle of elevation relative to a truly horizontal plane, at which it is desired to set the gun is fed by a computer 18 to the elevation resetter 16 and the angle of training (relative to a truly horizontal axis on the horizontal plane) at which it is desired to lay the gun is fed by the computer 18 to the training resetter 17. The elevation resetter 16 is electrically connected to an elevation corrector 19 which has an elevation correction signal fed thereto by the tilt corrector 13. The corrector 19 consists of magslips or selsyn devices 78 and 79 (Figure 3) referred to in greater detail hereinafter. The corrected output signal from the corrector 19 is applied to an amplifier 20 to control the motor 12. The resetter 17 is electrically connected to a training corrector 21 which has a training correction signal fed thereto by the tilt corrector 13. The corrector 21 consists of magslips or selsyn devices 75 and 76 (Figure 3) referred to in greater detail hereinafter. The corrected output signal from the training corrector 21 is applied to an amplifier 22 to control the training motor 8. The arrangement of resetter 16, amplifier 20, motor 12 and shaft 11, and the arrangement of resetter 17, amplifier 22, motor 8 and shaft 7 are each a follow-up remote central sysetm of the kind as described in co-pending United States patent application No. 336,067, now Patent No. 2,729,940. It will be understood therefore that in the case of elevation, the angle of elevation fed to the gun by the computer 18 is added to the elevation correction and the electrical sum causes the elevating motor 12 to run until the elevation of the gun 1, meaured by the resetter 16, is equal to said sum. The gun 1 will then be correctly laid in elevation. The gun 1 is trained in a like manner.

For an understanding of the theory upon which the tilt corrector 13 operates, reference will now be made to Figure 2 in which the line OA represents the axis of a gun barrel, 23 represents a truly horizontal plane and 24 represents the tilted plane of the gun mounting M. Angle KOL is the angle of tilt T. The line OE is the intersection of the two planes 23 and 24; OB is the projection of OA in the horizontal plane; OD is the projection of OA in the tilted plane 24; OF is the axis of the gun trunnions in the tilted plane, angle FOD being a right angle; and OH is the projection of OF in the horizontal plane. OC is the intersection of the planes 23 and AOD. Angle COD is referred to as the level of the gun, denoted by "LG", and the angle FOH is referred to as the cross level of the gun, denoted by "CLG."

The gun training with respect to the horizontal plane 23 is EOB whilst the gun training with respect to the tilted plane 24, denoted by GT, is EOD. The difference between the two training angles is $$EOB - EOD = COB + (EOC - EOD) \quad (1)$$

Thus,
$$EOD = EOB - COB - (EOC - EOD) \quad (2)$$

EOB is transmitted to the gun mounting by the computer 18, and therefore if also COB and $(EOC-EOD)$ are known, then EOD can be determined. COB and $(EOC-EOD)$ are given by the following formulae:

$$COB = \text{arc tan } [\sin CLG \tan (GE \pm LG)] \quad (3)$$

$$(EOC-EOD) = \text{arc tan } [\tan LG \text{ cosec } CLG]$$
$$- \text{arc tan } [\sin LG \cot CLG] \quad (4)$$

where "GE" is the gun elevation AOD relative to the tilted plane 24.

When the angle of tilt T is relatively small the value of $(EOC-EOD)$ is negligible and can be ignored. It is ignored in the tilt corrector mechanism described in greater detail hereinafter. If, however, an extremely high degree of accuracy is required, the functions of LG and CLG are available in the corrector and can be used, for example, in the form of a three dimensional cam to determine $(EOC-EOD)$.

LG and CLG are given by
$$LG = \text{arc tan } [\tan T \sin GT] \quad (5)$$
$$CLG = \text{arc sin } [\sin T \cos GT] \quad (6)$$

These formulae can be determined mechanically, but to simplify the tilt corrector mechanism at the expense of a negligible error, the tilt corrector described hereinafter utilises the following approximations:

$$LG = \text{arc tan } [T \sin GT] \quad (7)$$
$$CLG = \text{arc sin } [T \cos GT] \quad (8)$$

As will be described later, in the tilt corrector, the angle COB (as defined in Equation 3 above) is determined by a three-dimensional cam as a function of CLG and $(GE \pm LG)$, the tilt angle T is measured by means of spirit levels, whilst LG and CLG (as defined by Equations 7 and 8 above), are determined by a mechanical analyzer as functions of T and GT. The gun training GT (=EOD in Figure 2) is determined by adding EOB and —COB by magslips in the corrector 21.

As regards elevation, relative to the horizontal plane 23, the gun elevation QE is AOB whilst relative to the tilted plane 24 the gun elevation GE is AOD. The difference between these angles is $$AOB - AOD = (AOB - AOC) - COD \quad (9)$$
and
$$GE = AOD = AOB - (AOB - AOC) + COD \quad (10)$$

AOB is transmitted to the gun mounting by the computer 18 and therefore if COD (equals LG) and $(AOB-AOC)$ are known, then AOD (=GE) can be determined. The manner of determining COD (=LG) has already been indicated above. The formula for determining $(AOB-AOC)$ is $$(AOB-AOC) = \text{arc sin } [\cos CLG \sin$$
$$(GE \pm LG)] - (GE \pm LG) \quad (11)$$

In the tilt corrector 13 $(AOB-AOC)$ is determined by a three-dimensional cam as a function of CLG and $(GE-LG)$. The gun elevation GE (=AOD) is determined by adding QE (=AOB), LG (=COD) and $(AOB-AOC)$, by magslips in the corrector 19.

Referring now to Figure 3, the tilt corrector 13 shown therein has a plate 25 which serves as a reference member and which is pivotally connected to a gimbal ring or element 26 which lies in a plane parallel to the gun turntable. The plate 25 has two spirit levels 27 and 28 arranged at right-angles to each other (or may alternatively have four spirit levels in square formation, two being for fine accuracy and two for coarse). A leg 29 depends normally from the plate 25 and has a ball shaped foot 30 resting on the upper surface of a rotatable tilt setting cam 31, carried on a shaft 32 that is normal to the gun turntable. A hand-wheel device 33 is connected to drive the main pinion 34 of a differential 35, one output shaft 36 of which is connected through gear wheels 36A and 37A to drive a shaft 37, the latter having a gear wheel 38 engaging the periphery of the gimbal ring 26. It will be understood that for simplicity of representation all gear wheels in Figure 3 are shown as discs. The other main pinion 39 of the differential 35 is connected to be driven through gearing 39A by the shaft 15.

A handwheel device 40 is connected through gearing 40A to one main pinion 41 of a spur type differential 42, the other main pinion 43 of which is secured on the shaft 32. The carrier wheel 44 of the differential 42 meshes with a wheel 45 secured on the shaft 37.

A tilt cam 46 in the shape of a disc having a cam slot 47 is secured on the lower end of the shaft 32. Engaged in the slot 47 is the upper end of a connection pin or follower 48 having a slider block 49 located in a slot or guideway 50 of an analyzer wheel 51. The pin 48 also has a slider block 52 engaged in a slot 53 of a slider 54 and in a slot 55 of a slider 56. The sliders 54 and 56 are each L-shaped, the slots 53 and 55 each being located in one arm of their L-shaped sliders and the other arms 57 and 58 of the sliders 54 and 56 respectively being at right-angles to each other. The analyzer wheel 51 is arranged to be driven by a gear wheel 59 carried on the shaft 37.

The arm 58 of the slider 56 has a slot 59A for guiding a cam follower 60 mounted on an elevation correction shaft 61. The follower 60 is held in contact by a spring 60A with a three-dimensional cam 62 carried on a shaft 63. The cam 62 is designed in accordance with Equation 11 above. The arm 58 also has a slot 64 for guiding a cam follower 65 carried on a training correction shaft 65A. The follower 65 is held in contact by a spring 65B with a three-dimensional cam 66 carried on the shaft 63. The three-dimensional cam 66 is designed in accordance with Equation 3 above.

The arm 57 of the slider 54 is connected to drive one main pinion 67 of a differential 68 the other main pinion 69 of which is arranged to be driven by the shaft 14. The carrier 70 of the differential 68 is connected to a bevel wheel 71 which meshes with a bevel wheel 72 on a shaft 73. The shaft 73 drives the shaft 63 through worm gearing 74.

The shaft 65A is connected to drive the rotors of coarse and fine magslips 75 and 76.

The shaft 61 is connected through gearing 77 to drive the stators of coarse and fine magslips 78 and 79. The rotors of the magslips 78 and 79 are driven through gearing from a shaft 80 which has a gear wheel 81 engaging the arm 57 of the slider 54.

The tilt corrector described above is set up as follows. The handwheel device 33 is manually rotated. As the main pinion 39 of the differential 35 remains stationary at this juncture, the shaft 37 and hence the wheels 38, 45 and 59 and the gimbal ring 26 are turned. Manipulation of the handwheel 33 is continued until the level 28 is horizontal (as indicated by the bubble of the level). The axis about which the reference plate 25 is pivoted in the ring 26 then corresponds to EO of Figure 2. Whilst the handwheel 33 is being turned, the handwheel 40 and hence the pinion 41 remain stationary. The wheel 45 drives the shaft 32 and the tilt cam 46 through the differential 42 at the same speed as the wheel 59 drives the analyzer wheel 51. Hence whilst the shaft 37 rotates with the handwheel 40 stationary, no relative motion takes place as between the tilt cam 46 and the analyzer wheel 51. After adjusting the level 28 to the horizontal, the handwheel 40 is rotated whilst the handwheel 33, pinion 39 and hence shaft 37 remain stationary. Such rotation of the handwheel 40 causes rotation of the tilt setting cam 31 and such rotation is continued until the level 27 is also horizontal. This rotation of the tilt setting cam 31 and hence the shaft 32 causes relative motion as between the tilt cam 46 and the analyzer wheel 51, whereby the pin 48 is moved along the slot 47. The shape of the slot 47 is so designed in conjunction with the surface of the cam 31 that during levelling of the reference plate 25 by means of the handwheel 40, the pin 48 is set at a radius (with respect to the shaft 32) that is proportional to the angle of tilt T.

If now a training signal is transmitted to the gun mounting from the computer 18, the training motor 8 drives the turntable 4 and the shaft 15. Unless manipulated for levelling purposes, the handwheels 33 and 40 remain stationary during training and elevation of the gun. Hence the pinions 34 and 41 remain stationary. The shaft 15 causes the shaft 37 to be driven by an amount which is proportional to GT. Rotation of the shaft 37 turns the gimbal ring 26 and the cam 31 (through the differential 42) counter to the direction of rotation of the gun mounting and hence the level assembly comprising the reference plate 25, levels 27 and 28, the ring 26, and the cam 31, remain stationary in space. As mentioned above, rotation of the shaft 37 whilst the pinion 41 remains stationary causes the tilt cam 46 and the analyzer wheel 51 to rotate together at the same speed. As the amount of rotation of the shaft 37 is proportional to GT, the amount of rotation imparted to the tilt cam 46 and the wheel 51 will also be proportional to GT. It will be seen, therefore, that as viewed in plan, the pin 48 moves in a circular path through an angle proportional to GT and at a radius proportional to T. The pin 48 imparts motion to the sliders 54 and 56 by means of the sliding block 52 engaged in the slots 53 and 55. It can be readily seen that the arm 57 of the slider 54 has imparted thereto a movement proportional to $T \sin GT$ which as shown by Equation 7 is a function of LG. It can also readily be seen that the arm 58 of the slider 56 is moved by an amount proportional to $T \cos GT$ which from Equation 8 above will be seen to be a function of CLG.

When an elevation signal is transmitted to the gun mounting by the computer 18, the elevation motor 12 operates to elevate the gun and in doing so drives the shaft 14. The shaft 14 therefore rotates by an amount proportional to GE. The differential 68 has fed thereto by the slider 54, a movement proportional to LG and by the shaft 14, a movement proportional to GE. Hence the shaft 73 has a movement imparted thereto which is a function of $GE \pm LG$. The shaft 73 drives the shaft 63 which carries the three-dimensional cams 62 and 66 and hence the latter are rotated by an amount which is a function of $GE \pm LG$. The cam followers 60 and 65 are guided by the slider 56 to move longitudinally of their associated cams by an amount which is a function of CLG and by virtue of the shape of the surface of the cams, inter-engagement of the moving cams and followers causes the shaft 65A to turn by an amount proportional to COB (as given by Equation 3 above) and the shaft 61 to turn by an amount proportional to (AOB—AOC) (as given by Equation 11 above). The training correction COB is converted into an electrical signal by the magslips 75 and 76 and this electrical signal is electrically added to the training signal from the resetter 17.

The shaft 61 turns the stators of the magslips 78 and 79 by an amount which is proportional to $(AOB - AOC)$ and the shaft 80 turns the rotors of the magslips 78 and 79 by an amount which is proportional to LG whereby the electrical output signals from the magslips 78 and 79 are proportional to the elevation correction $AOB - AOC$ (as given by Equation 9). This elevation correction is electrically added to the signal from the elevation resetter 16.

Although in the tilt corrector described above, the tilt of the mounting M is measured by means of spirit levels, it is to be understood that the tilt could be measured by means of a pendulum or gyroscope mechanism and suitable servos, whereby the angle of tilt would be fed automatically to the analyzer comprising the cam 46 and the wheel 51.

I claim:

1. In a mounting for an article such as a gun which is directed at a particular angle of elevation with respect to a fixed plane, and at a particular angle of training with respect to an axis in this plane in accordance with elevation and training signals fed to the mounting from a remote computer, the mounting having means for elevating the article, and means for training the article and mounting together, and which mounting may be set up in a plane that is tilted with respect to the fixed plane, a tilt corrector carried on the mounting, the corrector comprising an analyzer, first means connected between the analyzer and the training means for feeding to the analyzer a first motion representative of the angle of training of the article, as measured with respect to the tilted plane of the mounting and a further axis determined by the intersection of the fixed and tilted planes, a reference member levellable without moving the tilted plane and connected to the analyzer for feeding a second motion to the analyzer, the second motion when said member is level being representative of the angle of tilt between the fixed and tilted planes, means in the analyzer for converting the first and second motions into a third motion which is a function of the level of the article and into a fourth motion which is a function of the cross-level of the article, said level being the angle between the projection of the axis of the article onto the tilted plane and the line of intersection as between the fixed plane and the plane that contains said projection and the axis of the article, said cross-level being the angle between a line in the tilted plane, which line passes through the axis of the article and is perpendicular to said projection, and the projection of the last-mentioned line onto the fixed plane, second means connected to the elevating means to have a fifth motion imparted thereto which fifth motion is representative of the angle of elevation of the article relative to the tilted plane, third means for combining the third, fourth and fifth motions to give an indication of the training correction required, and fourth means for combining the third, fourth and fifth motions to give an indication of the elevation correction required.

2. A tilt corrector as claimed in claim 1, and further comprising a mechanical drive between the first means and the reference member for causing, when the mounting is rotated for training purposes, the reference member to be turned in the opposite direction with respect to the mounting whereby the levelled reference member remains stationary in space during training.

3. A tilt corrector as claimed in claim 1, and further comprising an element rotatable about an axis extending in a general vertical direction, a generally horizontal pivotal connection between the element and the reference member whereby the latter is pivotally supported from said element, means for rotating said element about the axis extending in a general vertical direction, and means for tilting the reference member with respect to the element.

4. A tilt corrector as claimed in claim 3, wherein the tilting means includes a rotatable cam and wherein the second motion is fed to the analyzer by the cam.

5. A tilt corrector as claimed in claim 3, and further comprising two spirit levels on the reference member, the spirit levels being positioned at right-angles to each other, manual means for operating the rotating means to adjust the level of said member to bring the bubble in one of the spirit levels to the level position, and manual means for operating the tilting means to adjust the level of the reference member to bring the bubble of the other spirit level to the level position.

6. A tilt corrector as claimed in claim 5, and further comprising means for applying an output from the third means to the training means, and means for applying an output from the fourth means to the elevation means.

7. A tilt corrector as claimed in claim 1, and further comprising means for applying a signal responsive to the indication developed by the third means to the means for training the article and mounting together, and means for applying a signal responsive to the indication developed by the fourth means to the means for elevating the article.

8. In a mounting for an article such as a gun which is directed at a particular angle of elevation with respect to a fixed plane and at a particular angle of training with respect to an axis in this plane in accordance with elevation and training signals fed to the mounting from a remote computer, the mounting having means for elevating the article and means for training the article and mounting together, and which mounting may be set up in a plane that is tilted with respect to the fixed plane, a tilt corrector carried on said mounting and comprising an analyzer, first means connected to the training means to receive a first motion representative of the angle of training as measured with respect to the tilted plane of the mounting and a further axis determined by the intersection of the fixed and tilted planes, a reference member levellable without moving the tilted mounting, an element rotatable about an axis extending in a general vertical direction, a generally horizontal pivotal connection between the element and the reference member whereby the latter is pivotally supported from said element, a first device for controlling the level of the reference member, a first differential, a first mechanical drive from said first means to one input of the differential so that said first motion is fed to the differential, a second mechanical drive from said first device to the other input of the differential, a third mechanical drive from the output of the differential both to said analyzer to feed said first motion to said analyzer and to said element to rotate same about the axis extending in a general vertical direction, a rotatable cam for tilting the reference member with respect to said element, a second device for controlling the level of the reference member jointly with the first device, a second differential, a fourth mechanical drive between one input of the second differential and the second device, a fifth mechanical drive between the other input of the second differential and the output of the first differential, a sixth mechanical drive between the output of the second differential and both the rotatable cam and the analyzer so that levelling of said reference member causes a second motion representative of the angle of tilt between the fixed and tilted planes to be fed to said analyzer, means in the analyzer for converting the first and second motions into a third motion which is a function of the level of the gun and into a fourth motion which is a function of the cross-level of the gun, said level being the angle between the projection of the axis of the article onto the tilted plane and the line of intersection as between the fixed plane and the plane that contains said projection and the axis of the article, said cross-level being the angle between a line in the tilted plane, which line passes through the axis of the article and is perpendicular to said projection, and the projection of the last-mentioned line onto the fixed plane, second means connected to the elevating means to have a fifth motion imparted thereto which fifth motion is representative of the angle of elevation of the article relative to the tilted plane, third means for combining the third, fourth and fifth motions to give an indication of the training correction required, and fourth means for combining the third, fourth and fifth motions to give an indication of the elevation correction required.

9. A tilt corrector as claimed in claim 8, wherein the analyzer comprises an analyzer wheel connected to be rotated by said third drive according to the extent of said first motion, this wheel having a radially directed guideway, a block slidably mounted in said guideway and connected to said sixth drive to be positioned at a distance from the axis of the analyzer wheel in accordance with the extent of said second motion.

10. A tilt corrector as claimed in claim 9, wherein the sixth drive includes a tilt cam co-axial with the analyzer wheel and connected to be rotated by the output of the second differential, and a follower co-operating with the tilt cam and connected to said block so that during levelling of the reference member by means of the second device, the block is set at a radius proportional to the angle of tilt, the dimensions of the third, fifth and sixth drives being selected to ensure that during operation of the first means the tilt cam and analyzer wheel rotate together at the same speed so that the block moves in a circular path proportional to the first motion.

11. A tilt corrector as claimed in claim 9, wherein the converting means comprises a first slider having a first rectilinear slot, the first slider being mounted for movement perpendicular to the first slot, and a second slider having a second rectilinear slot perpendicular to said first slot, the second slider being mounted for movement perpendicular to the second slot, a further block located in the slots, a connection between the two blocks whereby movement of the first-mentioned block is transmitted to the further block so that during operation the first slider is moved by an extent proportional to the product of the angle of tilt and the sine of said angle of training with respect to the tilted plane, and the second slider is moved in proportion to the product of the angle of tilt and the cosine of the angle of training just mentioned.

12. A tilt corrector as claimed in claim 11, and further comprising a third differential, a seventh mechanical drive for feeding the fifth motion from the second means to one input of the third differential, an eighth mechanical drive for feeding the third motion from the first slider to the other input of the third differential whereby the output of the third differential is in proportion to said angle of elevation ± said level, wherein the third means combines the movements of the output of the third differential and the movement of the second slider, and wherein the fourth means also combines the movements of the output of the third differential and the movement of the second slider.

13. A tilt corrector as claimed in claim 12, wherein the third means comprises a shaft driven by the output of the third differential, a first three-dimensional cam mounted on this shaft, a first follower co-operating with the first three-dimensional cam, a training correction shaft on which the first follower is carried, and means for moving the follower longitudinally of the associated cam in accordance with the extent of the displacement of the second slider, and wherein the fourth means comprises a second three-dimensional cam mounted on the first mentioned shaft, a second follower co-operating with the second cam, an elevation correction shaft on which the second follower is carried, and means for moving the second follower longitudinally of its associated cam in accordance with the extent of the displacement of the second slider.

14. In a mounting for an article such as a gun which is directed at a particular angle of elevation with respect to a fixed plane, and at a particular angle of training with respect to an axis in this plane in accordance with elevation and training signals fed to the mounting from a remote computer, the mounting having means for elevating the article, and means for training the article and mounting together, and which mounting may be set up in a plane that is tilted with respect to the fixed plane, a tilt corrector carried on the mounting, the corrector comprising an analyzer, said analyzer responsive to a first motion from the training means representative of the angle of training of the article as measured with respect to the tilted plane of the mounting and a further axis determined by the intersection of the fixed and tilted planes, a reference member levellable without moving the tilted plane and connected to the analyzer for feeding a second motion to the analyzer, the second motion when said member is level being representative of the angle of tilt between the fixed and tilted planes, means in the analyzer for converting the first and second motions into a third motion which is a function of the level of the article and into a fourth motion which is a function of the cross-level of the article, the corrector including means connected to the elevating means to have a fifth motion imparted thereto, which fifth motion is representative of the angle of elevation of the article relative to the tilted plane, training corrector means for combining components of the third, fourth, and fifth motions to give an indication of the training correction required, and elevation corrector means for combining components of the third, fourth and fifth motions to give an indication of the elevation correction required.

References Cited in the file of this patent

UNITED STATES PATENTS

| | | |
|---|---|---|
| 1,937,336 | Ford et al. | Nov. 28, 1933 |
| 2,069,417 | Murtagh et al. | Feb. 2, 1937 |
| 2,410,016 | Crooke | Oct. 29, 1946 |
| 2,410,638 | Davis et al. | Nov. 5, 1946 |